United States Statutory Invention Registration [19]

[11] Reg. Number: H591

Leupold

[43] Published: Mar. 7, 1989

[54] METHOD OF MANUFACTURING OF A MAGIC RING

[75] Inventor: Herbert A. Leupold, Eatontown, N.J.

[73] Assignee: The United States of America as represented by the Secretary of the Army, Washington, D.C.

[21] Appl. No.: 215,094

[22] Filed: Jul. 5, 1988

[51] Int. Cl.[4] ..... H01F 7/06; B23P 17/00

[52] U.S. Cl. ..... 29/607; 29/416

*Primary Examiner*—Deborah L. Kyle
*Assistant Examiner*—Michael J. Carone
*Attorney, Agent, or Firm*—Sheldon Kanars; John T. Rehberg

[57] ABSTRACT

A method of making a permanent magnet magic ring structure. An annular cylinder made from a magnetically hard material is uniformly magnetized in a direction perpendicular to its major axis. The cylinder is cut into eight or sixteen or 32 or more segments. Various segments are interchanged with other segments to produce a magic ring which has an intense uniform magnetic field within a central working space.

4 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF MANUFACTURING OF A MAGIC RING

The invention described herein may be manufactured, used, and licensed by or for the Government for governmental purposes without the payment of any royalties thereon.

TECHNICAL FIELD

The present invention relates in general to permanent magnet structures for use in electronic devices, and more particularly, to an efficient, inexpensive method for manufacturing or constructing a magnetic structure known as a "magic ring".

BACKGROUND OF THE INVENTION

Many devices that employ magnetic fields have heretofore been encumbered by massive solenoids with their equally bulky power supplies. Thus, there has been increasing interest in the application of permanent magnet structures for such uses as electron beam focusing and biasing fields. The current demand for compact, strong static magnetic field sources that require no electric power supplies has created needs for permanent magnet structures of unusual form. A number of configurations have been designed and developed for electron beam guidance in millimeter-wave microwave tubes of various types; for dc biasing fields in millimeter-wave filters, circulators, isolators, striplines, and so on. Especially promising for such purposes is the configuration based upon the hollow cylindrical flux source (HCFS) principal described by K. Halbach in "Proceedings of the Eighth International Workshop on Rare Earth Cobalt Permanent Magnets", Univ. of Dayton, Dayton, Ohio, 1985 (pp. 123–136). An HCFS, sometimes called a "magic ring" is a cylindrical permanent magnet shell which produces an intense magnetic field that is more or less constant in magnitude within the cylindrical cavity. The field is perpendicular to the axis of the cylinder and, furthermore, the field strength can be greater than the remanence of the magnetic material from which the ring is made.

The ideal magic ring is an infinitely long, annular cylindrical shell which produces an intense magnetic field in its interior working space. The direction of the magnetic field in the working space interior is perpendicular to the long axis of the cylinder. The aforementioned Halbach publication discloses a structure with an octagonal cross section which closely approximates the performance and field configuration of an ideal magic ring (which has a circular cross section). In both the ideal and Halbach configurations, no magnetic flux extends to the exterior of the ring structure (except at the ends of a finite cylinder). The term "magic ring" as used herein encompasses not only the ideal cylindrical structure with a circular cross section, but also an octagonal, sixteen-sided, thirty-two sided and even higher order polygonal-sided structures which approximated the ideal magic ring.

Fabrication of complex magnetic structures such as the magic ring has been facilitated by the advent of magnetically "hard" materials, i.e., magnetic materials which maintain their full magnetization against fields larger than their B coercivities. Examples of magnetically hard materials are neodymium iron boride ($Nd_2Fe_{14}B$), samarium cobalt ($SmCo_5$), platinum cobalt ($PtCo_5$), and a samarium cobalt alloy ($Sm_2(CoT)_{17}$, where T represents a transition metal) together with selected ferrites. These materials may be pressed into various desired shapes and magnetized in a variety of desired orientations using techniques skilled to those known in the art.

However, there is at present no known way to orient and magnetize an annual cylinder in the continuous manner required by the ideal magic ring structure. Fortunately, good approximations are attainable in practice. A sixteen-sided magic ring produces an interior magnetic field which is equal to approximately 98 percent of the field produced by the ideal structure. A coarser eight-sided magic ring still produces an interior field that is approximately 92 percent of the continuous ideal. Nevertheless, the manufacture of numerous magic ring segments, each with a different magnetic orientation is a costly procedure. Although the eight segments of an eight-sided (octagonal) magic ring are geometrically identical, they must be aligned in four different directions, necessitating either four separate dies or some type of indexing procedure that would orient the same die in four different directions. The manufacturing problem, of course, becomes more serious when closer approximations to the ideal structure are sought by an increase in the number of segments.

Those concerned with the development of novel magnetic structures and especially with uses for the magic ring have continuously sought easier, cheaper, and simpler methods for its manufacturer.

SUMMARY OF THE INVENTION

It is therefore an object of this invention to provide a simple inexpensive method for manufacturing a magic ring structure.

It is another object of this invention to provide a method of fabricating a magic ring structure which does not require special magnetic alignment dies or procedures.

The above and other objects are achieved in accordance with the present invention. An annular shell of the desired height is made from a magnetically hard material using procedures well known to those skilled in the art. The structure is uniformly transversly magnetized. That is, the magnetization vector, M, of the annular shell is constant throughout the shell and points in a direction perpendicular to the long axis of the cylindrical shell. The shell is then cut into the desired number of segments, i.e., 8, 16, 32, etc. The individual segments are then repositioned somewhat like a jigsaw puzzle. An imaginary diametral mirror plane is envisioned. Each segment is exchanged with its mirror-image segment. The resulting structure when re-assembled is a magic ring.

BRIEF DESCRIPTION OF THE DRAWINGS

Further objects and advantages of the present invention will become apparent to those familiar with the art upon examination of the following detailed description and accompanying drawings in which.

DETAILED DESCRIPTION

Figure 1:
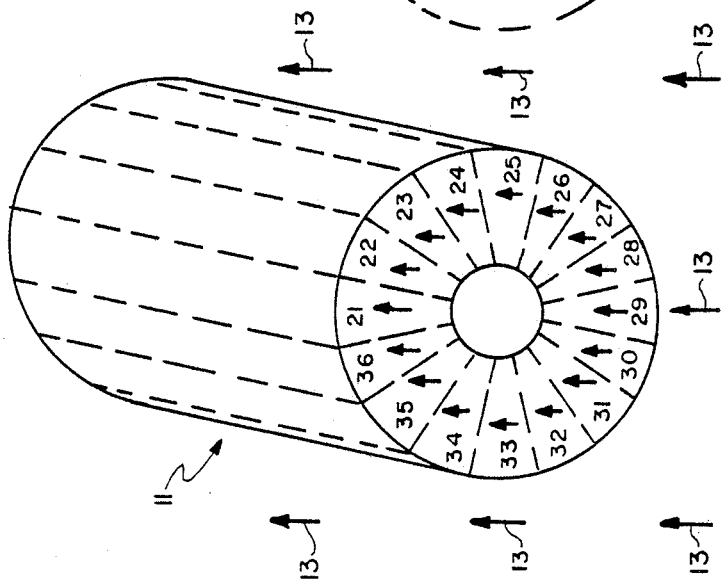
FIG. 1 is a perspective view of an annular cylinder fabricated according to a preliminary step of the present invention.

In FIG. 1 reference numeral 11 designates an annular cylinder made from a magnetically hard material. During fabrication cylinder 11 is exposed to external magnetic field 13. Consequently, the entire cylinder 11 has a uniform magnetization, M, which points in the same direction as the external magnetic field 13. Methods for fabricating annular cylinders from magnetically hard materials and subjecting such cylinders to uniform external magnetic fields such as that designated by reference numeral 13 are well known to those skilled in the art.

After cylinder 11 has been fabricated, it is cut into either 8, 16, 32, or a larger number of segments. For convenience, FIG. 1 shows cylinder 11 cut into sixteen segments denoted by reference numerals 21, 22, 23, 24, 25, 26, 27, 28, 29, 30, 31, 32, 33, 34, 35, and 36. Each segment is the same size. Thus, in FIG. 1, the angular span of each segment is: $360°/16=22.5°$. The magnetization of each segment 21–36 is designated by an arrow, which, as mentioned before, is parallel to the external field 13.

Figure 2A:
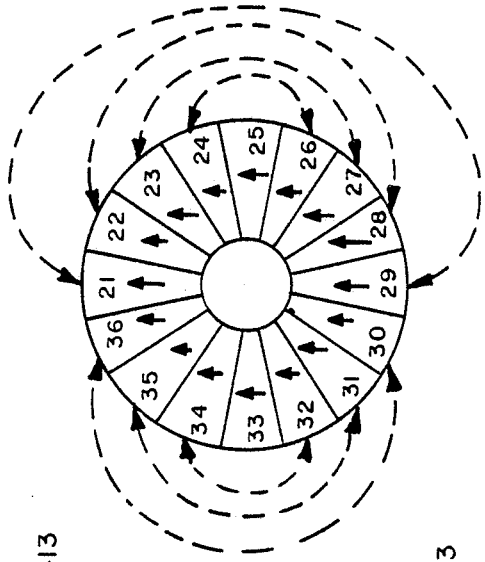
FIGS. 2 and 2*a* are cross sectional diagrammatic views illustrating how magic ring segments are interchanged.
Figure 2B:
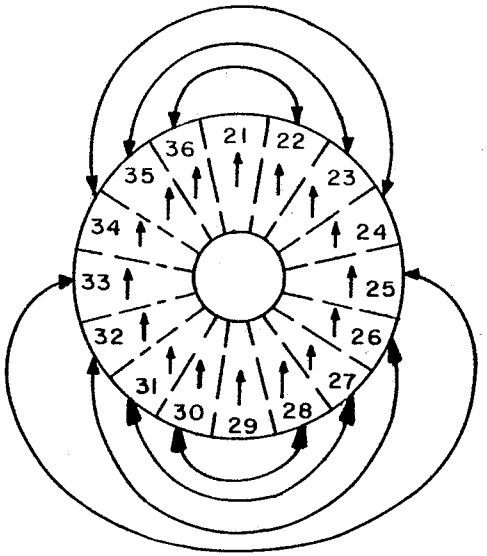

FIG. 2 illustrates how segments 21–36 are interchanged to produce an effective magic ring structure. Segments 25 and 33 retain their original positions. Segments 25 and 33 may be regarded as containing an imaginary diametral mirror plane. If the angular position of any one of the other segments with respect to the reference plane is denoted by $\theta$, that segment is interchanged with its mirror-image segment whose angular position is $-\theta$. Thus, segment 22 is interchanged with segment 28. Segment 23 is interchanged with segment 27. Segment 24 is interchanged with segment 26. Segment 36 is interchanged with segment 30. Segment 35 is interchanged with segment 31. And finally, segment 34 is interchanged with segment 32.

Figure 3A:
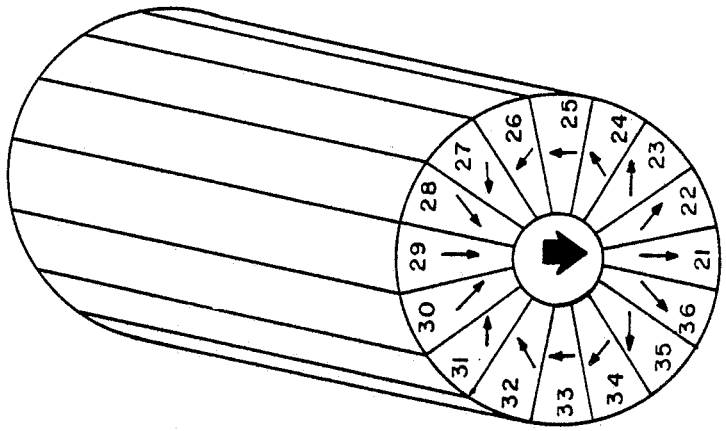
FIGS. 3 and 3*a* are perspective views of completed magic ring structures produced according to the present invention.
Figure 3B:
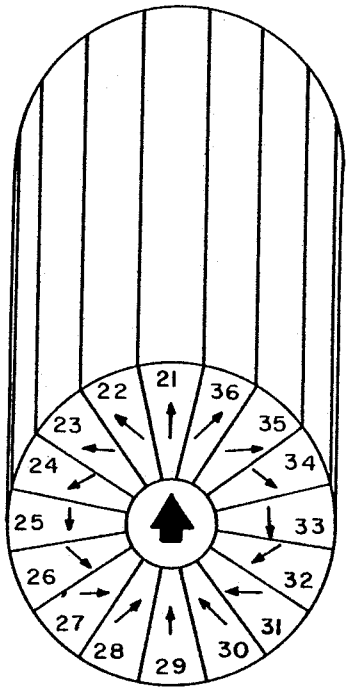

The resulting structure is illustrated in FIG. 3. The structure illustrated in FIG. 3 is a magic ring structure with an intense internal magnetic field 50 within its interior working space.

The procedure just described may be applied to make magic rings with any number of segments (as long as the number of segments is evenly divisible by 4). The procedure just described involves exchange of segments through a mirror plane which is coincidentally perpendicular to the initial direction of magnetization (i.e. the mirror plane bisects segments 25 and 33). An alternative scheme for interchanging magnet segments is shown in FIG. 2A. In FIG. 2A, the imaginary mirror plane bisects segments 21 and 29, which are "unmoved". Segments 22 and 36 are interchanged; segments 23 and 35 are interchanged; segments 24 and 34 are interchanged; setments 25 and 33 are interchanged; segments 26 and 32 are interchanged; segments 27 and 31 are interchanged; and finally, segments 28 and 30 are interchanged. The resulting structure is illustrated in FIG. 3A. Comparison of FIGS. 3 and 3A reveals that they are identical structures—one merely being turned upside down with respect to the other. As before, the mathematical prescription for interchange may be written as:

$$S(\theta) \rightleftarrows S(-\theta)$$

Other imaginary mirror planes may also be used. For example, referring to FIG. 1, let the mirror plane bisect segments 34 and 26. Then the following segment pairs are interchanged: 25-27; 24-28; 23-29; 22-30; 21-31; 36-32; 35-33. The resulting structure is a magic ring.

Returning now to FIG. 1, it should be noted that segments 21–36 may not be cut willy-nilly from the magnetized annular cylinder. Once the number of desired segments is chosen, the angular width of each segment is mathematically determined. (In the example shown in FIG. 1, sixteen segments with an angular width of 22.5° are illustrated). The segments 21–36 must be cut so that the aforementioned imaginary mirror planes can be utilized. For example, an imaginary mirror plane which is perpendicular to the direction of magnetizing field 13 must bisect segments 25 and 33 (which include the three o'clock and nine o'clock positions respectively of the cylindrical cross section). Once the boundaries of segments 25 and 33 are determined, the boundaries of all other segments, being 22.5° apart are easily determined. Alternatively, an imaginary mirror plane which is parallel to the direction of magnetizing field 13 must bisect segments 21 and 29. Once the boundaries of segments 21 and 29 are determined, the boundaries of all other segments being 22.5° apart are easily determined.

An alternative view of the cutting process is obtained by noting that two segments (21 and 29) have magnetizations which are parallel to their angular bisectors. Two segments (25 and 33) have magnetizations which are perpendicular to this angular bisectors.

Of course, the outside contour of each segment may be flattened, making a magic ring with a sixteen sided cross section at some expense to the strength and uniformity of the internal field.

Structures such as those disclosed above will provide compact, simple, easily portable sources of uniform transverse magnetic fields of 20 or 30 kilo Oersteds if magnetically hard materials of remanence greater than 10 kilo Gauss are used. Individual segments may be epoxied or held together with external bands. These structures have the advantage of being much lighter and more compact than equivalent electric solenoids and require zero energy expenditure in operation.

Accordingly, having shown and described what is at present considered to be several preferred embodiments of the invention, it should be understood that the same has been shown by way of illustration and not limitation. All modifications, alterations and changes coming within the spirit and scope of the invention are herein meant to be included.

What is claimed is:

1. A method of making a magic ring comprising:

cutting a magnetized annular cylinder into segments, the number of said segments being evenly divisible by 4, said cylinder having an interior working space and an axis and being uniformly magnetized in a direction perpendicular to said axis;

interchanging pairs of said segments to produce an annular cylinder with an interior working space, said working space having a relatively uniform magnetic flux density therein.

2. A method of making a magic ring comprising the steps of:

cutting a uniformly magnetized annular cylinder into sixteen equi angular segments, two of said segments having a magnetization vector which is parallel with its angular bisector;

defining a mirror plane which bisects said two segments;

interchanging the remaining fourteen segments in pairs, each segment being interchanged with its mirror image segment in said mirror plane to form an annular cylinder with magic ring properties.

3. The method of claim 1 wherein said annular cylinder is made from a magnetically hard material.

4. A method of making a magic ring comprising the steps of:

cutting a uniformly magnetized annular cylinder into segments, the number of said segments being evenly divisible by four;

defining a diametral mirror plane which bisects two said segments;

interchanging the remaining said segments pairwise about said mirror plane to produce a magnetic ring.

* * * * *